E. V. HARTFORD.
GRADUATED SHOCK ABSORBER.
APPLICATION FILED AUG. 15, 1905.

1,000,264.

Patented Aug. 8, 1911.

Witnesses:
Chas. D. King
Adolph G. Dines

Inventor.
Edward V. Hartford
by Dunn & Fink
Attys.

UNITED STATES PATENT OFFICE.

EDWARD V. HARTFORD, OF NEW YORK, N. Y.

GRADUATED SHOCK-ABSORBER.

1,000,264.

Specification of Letters Patent. Patented Aug. 8, 1911.

Application filed August 15, 1905. Serial No. 274,267.

*To all whom it may concern:*

Be it known that I, EDWARD V. HARTFORD, a citizen of the United States, residing in New York city, county and State of New York, have invented certain new and useful Improvements in Graduated Shock-Absorbers, of which the following is a full, clear, and exact specification.

My invention relates to certain new and useful improvements in suspensions for vehicle, and consists of the novel features and arrangements of parts hereinafter pointed out. Previous to my present invention devices of this kind have been used for retarding the action of the supporting springs of a vehicle, and the constructions have usually consisted in two or more friction disks, having a variable adjusting means for regulating the tension between the disks, and which are provided with arms and pivotal connections for securing them to the running gear and body portion of a vehicle, respectively. Such a device is shown in U. S. Letters Patent No. 743,995, granted to J. M. M. Truffault, Nov. 10, 1903, and while this construction is very valuable in preventing excessive vibration and the consequent breaking of springs, I find that it can be improved upon, for the reason that when it is adjusted so as to take care of violent oscillations of the springs, it may operate stiffly when the oscillations are of smaller magnitude. Conversely, if it is adjusted for small vibrations it may not control the more violent ones properly.

My present invention has for its object, the overcoming of this difficulty.

It consists broadly in providing a variable retarding means, so constructed that it offers a substantial resistance to all kinds of spring vibrations, and this resistance is substantially proportional to the amount of said vibrations, that is, the greater the vibration of the spring, the greater will be the retarding action of the device.

Figure 1:
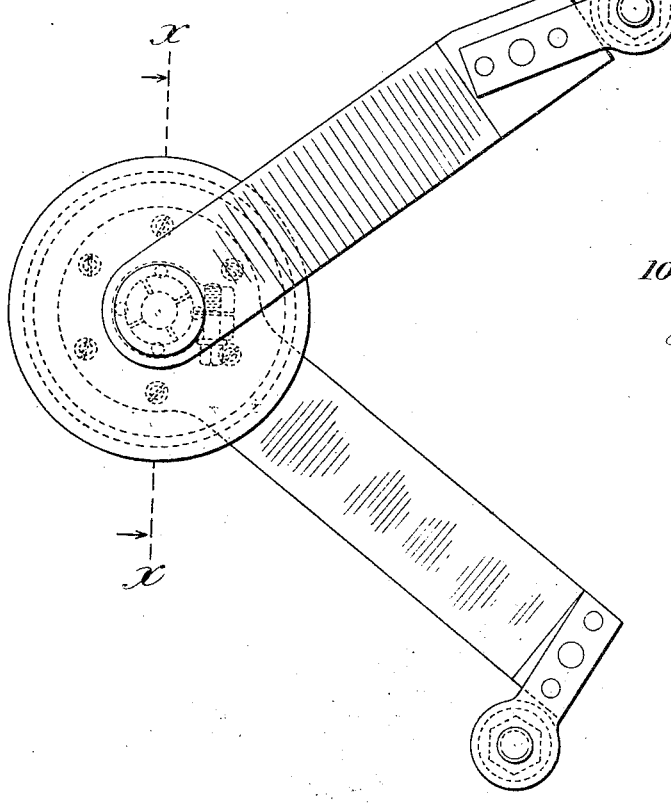
Figure 2:
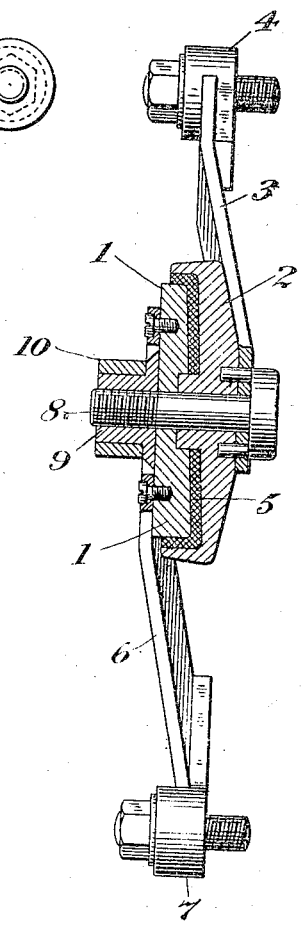

In the drawings which illustrate one form of my invention, Figure 1, is a side elevation showing the parts in their normal position, wherein the resistance to movement is at its minimum. Fig. 2, is a cross-sectional view of the same, taken on the line x—x of Fig. 1.

In its general construction, my device is similar to the structure of the patent above referred to, and it consists of the disks 1 and 2, the latter being provided with an arm 3 and a pivotal connection 4, for securing it to one of the parts of a vehicle between which the supporting spring is interposed. The pivotal connection may be of any desired character, such, for instance, as that disclosed in the patent aforesaid. The disk 2, is recessed, and a washer 5 made of fiber or other suitable material is provided, to prevent wear on the disks. To the disk 1 is also secured an operating arm 6 which has a connection 7 similar to that upon the other arm. A bolt 8 passes through both disks, and in connection with an adjusting nut 9 serves to maintain the proper tension between the parts; and a lock nut 10 is provided for retaining the parts in the adjusted position. The disks 1 and 2 are slightly beveled, as shown, and are shown in their normal position of least friction, in Figs. 1 and 2.

It will be readily seen that any rotation of the disks upon each other, tends to increase the friction between the same, for the reason that it tends to bring corresponding thick portions of the disks together, and thereby jam them. It will be obvious that the greater the movement, the greater will be the friction caused, and the bevel of the disks may be so proportioned as to readily compensate for the different strengths of spring, and so operate uniformly to retard the same, no matter what its period or degree of oscillation may be.

For the sake of clearness, I may explain that vehicle springs are usually constructed of a series of flat leaves, so arranged that they are brought consecutively into play according to the amount of strain put upon the spring; that is, but one or two leaves of the spring may be employed to resist a slight shock, but if the shock is very violent, it may bring five or six leaves into play, and thereby greatly increase the resistance of the spring, and likewise the recoil thereof, in proportion thereto. By my present invention, it will be readily seen that not only is the retarding action provided for all these various degrees of shock and vibration, but it is provided in proportion to the strength thereof.

The washer, situated between the disks, possesses a certain amount of resiliency, which will usually be found sufficient to prevent a jamming of the parts. Should a greater amount of resiliency than the washer would provide, however, be required, a spring such as is shown in my pending application Serial No. 263,307, may be interposed between the nut 9 and the disk 1.

The form shown in the drawings is obviously but one concrete example and embodiment of my invention, and many modifications and changes in the structural details may be made therefrom, without departing from the spirit of the invention, and I do not limit myself to the particular form shown and described; but

What I claim and desire to secure by Letters Patent is:

1. An anti-vibration device, comprising a plurality of friction members, means for adjusting the friction between said members, means for connecting the said members to the running gear and body portion of a vehicle, respectively, the said members having a minimum frictional contact when they are in their normal position, and being so arranged that the friction is gradually increased as they are moved from said normal position in either direction, substantially as described.

2. An anti-vibration device, comprising a plurality of friction members, means for connecting said members to the running gear and body portion of a vehicle, respectively, the members being so arranged as to have a minimum degree of friction between them when in their normal position, but said friction, however, being increased in direct proportion to any movement of the members from their normal position, substantially as described.

3. An anti-vibration device, comprising a plurality of friction members adapted to rotate about a common center, adjusting means for regulating the pressure between said members, means for connecting said members to the running gear and body portion of a vehicle, respectively, the said members having a normal relative position of minimum friction, but being so arranged that the friction is gradually increased by their movement in either direction from the said normal position, substantially as described.

4. An anti-vibration device, comprising a plurality of friction members having contacting surfaces of a constant and uniform area, means for connecting said members to the running gear and body portions of a vehicle, respectively, means for adjusting the pressure between the said members, said members being so arranged as to have a gradually increasing friction between them as they are moved in either direction from their normal position of minimum friction, substantially as described.

5. An anti-vibration device, comprising a plurality of friction members, means for connecting said members to the running gear and body portion of a vehicle, respectively, means for adjusting the pressure between the said members, said members being so arranged as to have a normal position of minimum friction, which friction is gradually increased by any movement from such normal position, the movement of the friction members, however, being relatively small compared with the movement of the spring supported parts of the vehicle, substantially as described.

6. An anti-vibration device, comprising a plurality of friction members, means for adjusting the friction between said members, arms secured to said members, provided with pivotal means thereon for connecting with the running gear and body portion of a vehicle, respectively, the friction members being so arranged as to have a minimum friction when they are in their normal position, but which friction is gradually increased as they are moved from said normal position in either direction, substantially as described.

7. An anti-vibration device, comprising a plurality of friction members, arms secured to said members, having pivotal means thereon for connecting with the running gear and body portion of a vehicle, respectively, the members being so arranged as to have a minimum friction when they are in their normal relative position, but said friction, however, being increased in direct proportion to any movement thereof from said position, substantially as described.

8. An anti-vibration device, comprising a plurality of friction members adapted to rotate about a common center, pivotal adjusting means for regulating the pressure between said members, arms secured to said members having pivotal means thereon for connecting with the running gear and body portion of a vehicle, respectively, the friction members being so arranged as to have a normal relative position of minimum friction, but which friction is gradually increased by movement in either direction from said normal position, substantially as described.

9. An anti-vibration device comprising a plurality of relatively rotary friction members having a common axis, friction material between the said members, arms secured to said members and adapted to connect them to the parts of the vehicle movable relatively to each other, said members being so arranged as to have a normal relative position of minimum friction, but which friction is progressively increased by relative movement of said members in either direction from said normal position.

10. An anti-vibration device, comprising a plurality of friction disks rotatable around a common center, friction means between said disks, arms secured to said disks for connecting them with the parts of a vehicle movable relatively to each other, the said disks having beveled contact surfaces, substantially as described.

11. An anti-vibration device, comprising friction disks rotatable around a common center, adjustable clamping means for regulating the tension between said disks, means for connecting the disks to the parts of a vehicle movable relatively to each other, friction material between said disks, the said disks having slightly beveled contact surfaces, so as to afford a variable resistance to the relative movement thereof, substantially as described.

12. An anti-vibration device, comprising a recessed friction disk, a second disk adapted to be seated in said recess, friction material between said disks, means for adjustably clamping said disks in operative position, means for connecting said disks to the running gear and body portion of a vehicle, respectively, said disks having slightly beveled contact surfaces, so as to afford a variable resistance to any relative movement thereof, substantially as described.

13. An anti-vibration device, comprising a recessed friction disk, a second disk adapted to be seated in said recess, a pivotal bolt and nut for adjusting the pressure between said disks, a locking device for holding the same in the adjusted position, means for connecting said disks to the running gear and body portion of a vehicle, respectively, said disks being provided with beveled contact surfaces, so as to afford a variable resistance to any relative movement thereof, substantially as described.

14. An anti-vibration device, comprising a plurality of concentric rotary friction members having friction faces, the adjacent portions of which are inclined relatively to their plane of movement, connections to the running gear and body portion of the vehicle respectively, the said parts so arranged that a movement of the said parts of the vehicle relatively to each other from the normal position will progressively increase the friction between the said friction faces, substantially as described.

In testimony whereof I have hereunto set my hand in the presence of two subscribing witnesses.

EDWARD V. HARTFORD.

Witnesses:
A. Y. HOFFMAN,
J. SPENCER WEED.